United States Patent [19]

Nakata et al.

[11] Patent Number: 5,412,509
[45] Date of Patent: May 2, 1995

[54] LIGHT SOURCE UNIT INCORPORATING LIGHT EMITTING DEVICE AND OPTICAL DEVICE

[75] Inventors: Naotaro Nakata, Kyoto; Kazutoshi Yamazaki, Kasaoka, both of Japan

[73] Assignee: Rohm Co., Ltd., Kyoto, Japan

[21] Appl. No.: 93,927

[22] Filed: Jul. 20, 1993

[30] Foreign Application Priority Data

Jul. 21, 1992 [JP] Japan .................................. 4-193816

[51] Int. Cl.⁶ ................................................ G02B 7/02
[52] U.S. Cl. ...................................... 359/811; 342/258
[58] Field of Search .................. 359/811; 356/76 PL, 356/76 L

[56] References Cited

U.S. PATENT DOCUMENTS

| | | | |
|---|---|---|---|
| 4,821,051 | 4/1989 | Hediger | 346/155 |
| 5,032,960 | 7/1991 | Katok | 362/240 |
| 5,191,481 | 3/1993 | Takizawa et al. | 359/811 |
| 5,271,079 | 12/1993 | Levinson | 385/46 |

*Primary Examiner*—Loha Ben
*Assistant Examiner*—Thomas Robbins
*Attorney, Agent, or Firm*—Nikaido, Marmelstein, Murray & Oram

[57] ABSTRACT

A semiconductor laser is inserted into a first hole of a fixing member. An optical system including a cylindrical lens barrel and a lens attached inside the lens barrel is inserted into a second hole in order to direct a light beam emitted from the semiconductor laser to a predetermined position. The first and second holes are formed to be opposite to each other and are arranged on the same axis. The semiconductor laser and the optical system inserted into the first and second holes, respectively, so as to be partly exposed are fixed by laser welding at entrances of the first and second holes. The fixing member is provided with a third hole vertically penetrating the second hole. An adhesive is filled into the third hole. Further, an adhesive is applied onto laser welding points at the entrance of the first hole.

8 Claims, 6 Drawing Sheets

LIGHT SOURCE UNIT INCORPORATING LIGHT EMITTING DEVICE AND OPTICAL DEVICE

BACKGROUND OF THE INVENTION

1. Field of the Invention

The present invention relates to a light source unit, and more specifically, to a light source unit incorporating a light emitting device and an optical device, for use in a laser beam printer, a copying apparatus, a laser facsimile apparatus, a laser composing apparatus, a bar code reader and a sensor.

2. Description of the Prior Art

Light source units having semiconductor lasers are used as light emitting sources for various apparatuses such as the above-mentioned ones. For example, in an image forming apparatus such as a laser beam printer, a copying apparatus and a facsimile apparatus, a light source unit is used as an apparatus for irradiating a laser beam for forming images such as letters and pictures on an electrophotographic drum at a high speed. In a laser composing apparatus, it is used as an apparatus for irradiating a laser beam for making master film for printing. In a bar code reader and various types of sensors, it is used as an apparatus for irradiating a laser beam for obtaining information by means of reflected beams from a bar code and an object.

Typically, a light source unit used as a light emitting source for various apparatuses such as the above-mentioned ones has a structure where one, or two or more pairs of semiconductor laser and collimator lens are fixed to a fixing member. FIG. 1 shows a part of a typical multi-channel light source unit 3. Although the light source unit 3 is of a structure where a plurality of bar bodies 34 are fixed to a base board 5, in FIG. 1, only one eight-channel bar body 34 is shown which is fixed to the base board 5 by screws 35 at both ends.

In the bar body 34, as shown in the plan view of FIG. 2 (cross-sectional structure is partly shown), eight holes H1, and eight holes H2 arranged opposite to the holes H1 with a groove therebetween are formed. Into each of the holes H1, a semiconductor laser 40 is inserted. Into each of the holes H2, a lens barrel 20 in which a lens 15 is fixed is inserted.

The semiconductor laser 40 and the lens barrel 20 are typically fixed to the bar body 34 by YAG laser welding or an adhesive. In the light source unit 3 of FIG. 1, the fixing is performed by YAG laser welding. Each lens barrel 20 is, as shown in FIGS. 1 and 2, YAG laser-welded to the bar body 34 at four points $P_1$ to $P_4$. Regarding the semiconductor lasers 40, the welding is performed to four points $Q_1$ to $Q_4$ ($Q_2$ and $Q_4$ are omitted) as shown in FIG. 2. YAG laser welding is performed by irradiating a YAG laser beam from a YAG laser irradiating nozzle unit to the border between the bar body 34 and the semiconductor laser 40.

The fixing by an adhesive will be described with reference to FIGS. 1 and 2. In order to fix the lens barrel 20, a hole is formed in a part of the bar body 34 in a vertical direction toward the lens barrel 20 inserted into the hole H2, and an adhesive is filled into the hole. In order to fix the semiconductor laser 40, the adhesive is applied on the welding points $Q_1$ to $Q_4$ shown in FIG. 2. As the adhesive, an instantaneous adhesive (e.g. one made of cyanoacrylate) or an ultraviolet setting adhesive (e.g. one made of epoxy acrylate) or a two-component room temperature setting adhesive (e.g. one made of epoxy resin) or a two-component thermosetting adhesive (e.g. one made of epoxy resin) is used.

In the case where the fixing is performed by YAG laser welding, the lens barrel 20 or the semiconductor laser 40 is instantaneously fixed under a condition where it is accurately positioned, and the strengths at the welding points are high. However, since the YAG laser welding is a spot welding performed to a small portion into which a laser spot can go, the welded portions are fragile and have a lower degree of tolerance for a shock. For example, the lens barrel 20 inserted into the hole H2 as shown in FIG. 2 is rotation-decentered (at an angle $\theta$ of decentering) by a shock within a clearance between the bar body 34 and the lens barrel 20 so that the optical axis of the lens 15 shifts from the position of an optical axis AX1 (vertical to a reference surface $S_0$) to the position of an optical axis AX2.

In the case where the fixing is performed by an adhesive, even though the lens barrel and the semiconductor laser have been positioned, it is necessary to do something to maintain the positioned condition until the adhesive sets while monitoring the laser beam irradiated through the lens 20 from the semiconductor laser 40. In the case where a two-component adhesive is used, although its adhesive strength is high, its setting time is long; it takes several minutes (several tens of minutes to several hours in the case of the two-component thermosetting adhesive) for the adhesive to set. Accordingly, it takes a long time to fix each, so that the cycle time of manufacturing the light source units per a fixing apparatus is long. In the case where the ultraviolet setting adhesive is used, although its setting time is short and its adhesive strength is high, only a small portion into which ultraviolet rays can go can be fixed. For this reason, with only this adhesive agent, it is difficult to make fixing to desired positions. In the case where the instantaneous adhesive is used, although its setting time is short, its adhesive strength is low and decreases with time, and the lens may be clouded according to the application position of the instantaneous adhesive.

SUMMARY OF THE INVENTION

An object of the present invention is to provide a light source unit where a light emitting means such as a semiconductor laser, and an optical system constituted by a lens barrel having a lens is fixed to a fixing member with a high strength, said light source unit having a high degree of tolerance for a shock.

To achieve the above-mentioned object, a light source unit of the present invention is provided with light emitting means, an optical system for directing light emitted from the light emitting means to a predetermined position, a fixing member having holes for holding the light emitting means and the optical system, fixing means formed by laser welding at an entrance of each of the holes in order to fix to the fixing member the light emitting means and the optical system inserted into the holes so as to be partly exposed, and an adhesive applied in order to fix at least one of the light emitting means and the optical system inside the holes.

With such features, since the fixing of the light emitting means or the optical system to the fixing member is performed by laser welding from the outside of the fixing member to the border between the fixing member and the lens barrel or between the fixing member and the light emitting means and by application of the adhesive inside the fixing member to the fixing member and the light emitting means or the optical system, when a shock is given, rotation decentering of the light emitting means or the optical system hardly occurs owing to mutual compensation between the two types of fixing.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
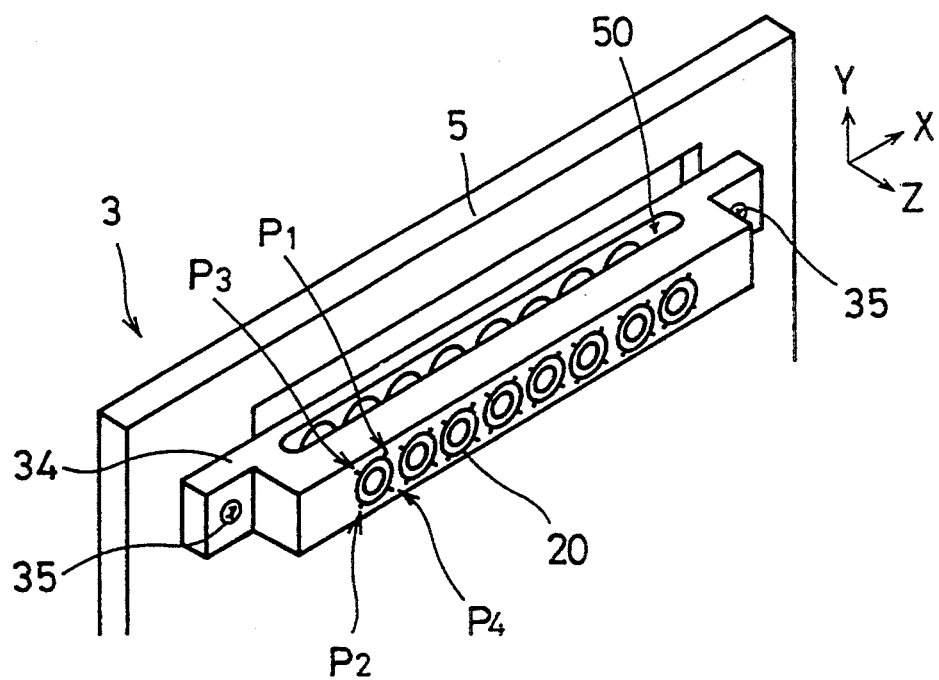
FIG. 1 is a perspective view showing the exterior of a principal portion of a conventional light source unit.
Figure 2:
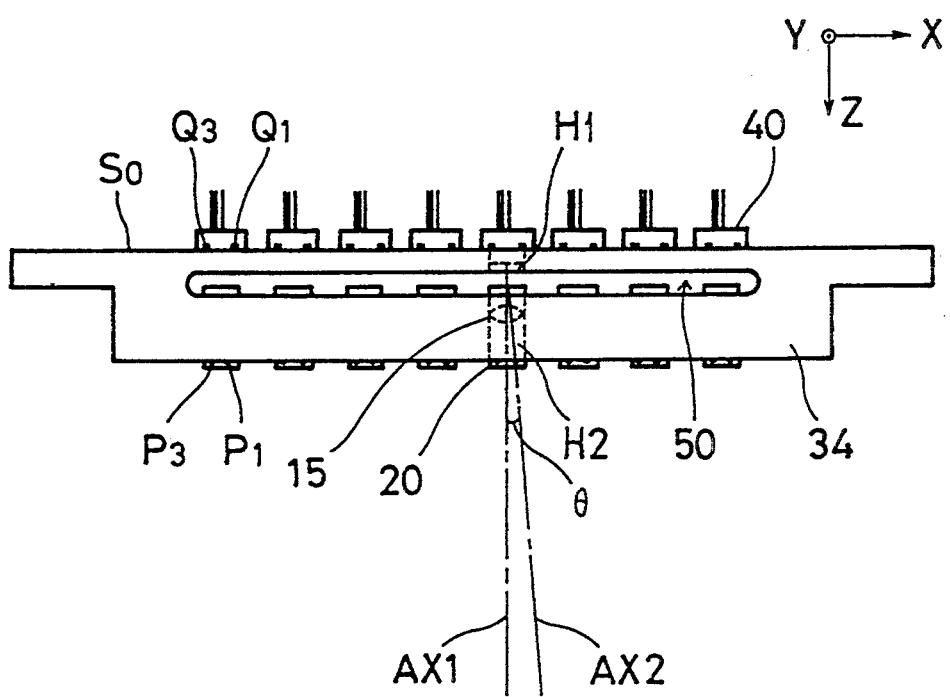
FIG. 2 is a plan view showing the exterior of a principal portion of the conventional light source unit.
Figure 3:
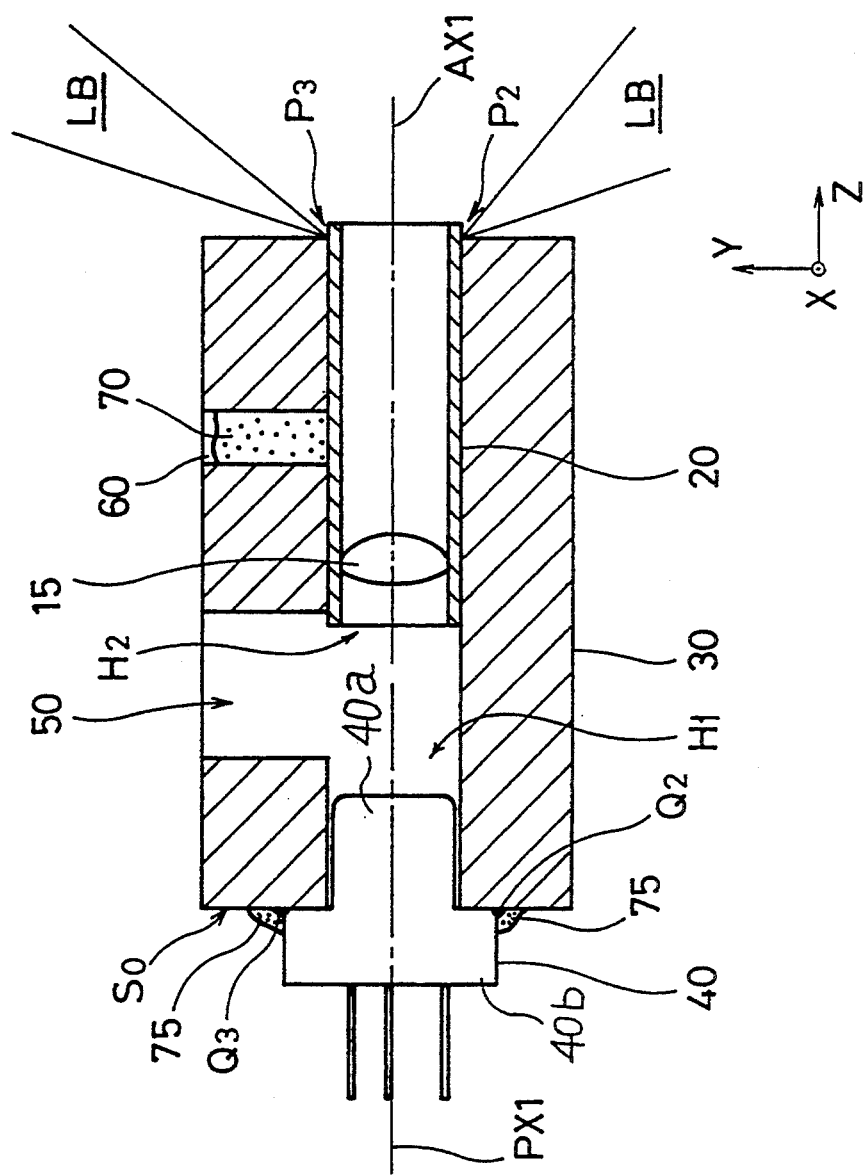
FIG. 3 is a cross-sectional view showing the structure of a principal portion of a light source unit which is an embodiment of the present invention.
Figure 4:
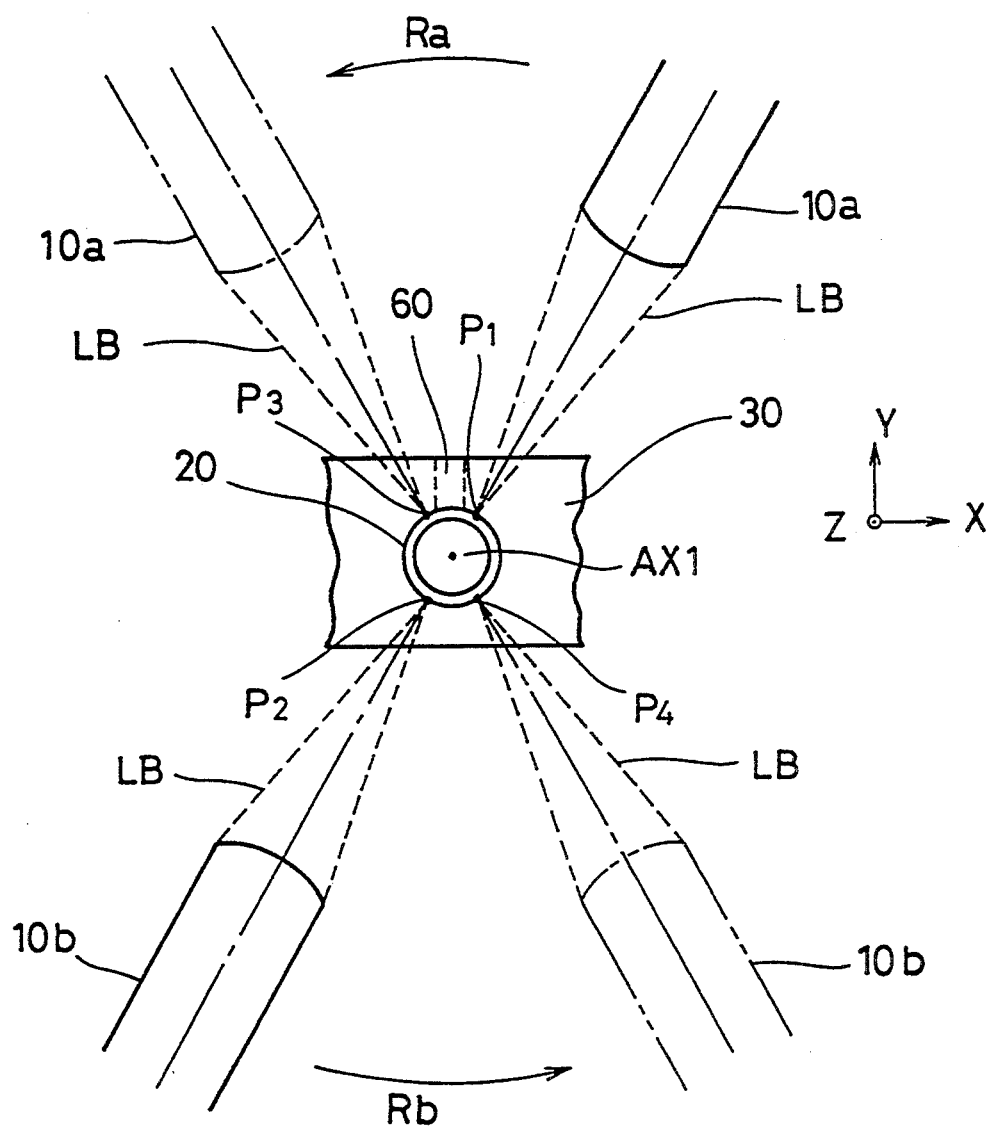
FIG. 4 is a view showing YAG laser welding in the manufacturing process of the light source unit of the present invention.
Figure 5:
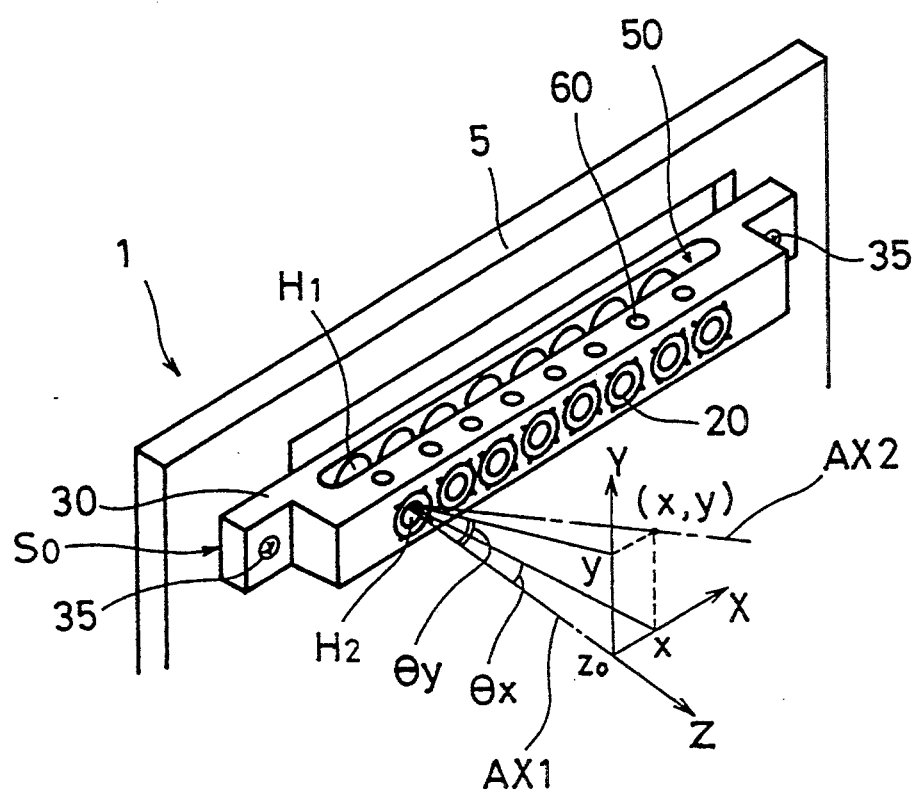
FIG. 5 is a perspective view showing the exterior of a principal portion of the light source unit of the present invention.

Hereinafter, embodiments of the present invention will be described with reference to the drawings. FIG. 3 is a cross-sectional view schematically showing the structure of a principal portion of an embodiment of the present invention. FIG. 4 shows YAG laser welding performed in this embodiment. FIG. 5 is a perspective view showing the exterior of a principal portion of this embodiment. Elements and portions the same as those of the conventional light source units of FIGS. 1 and 2 are denoted by the same reference designations, and detailed description thereof will be omitted.

A light source unit 1 according to this embodiment is constituted mainly by the semiconductor laser 40 (an iron package plated with nickel-gold with a diameter φ of 5.6 mm), the lens 15 (with a focal length of 5 mm) for directing a laser beam from the semiconductor laser 40 to a predetermined position, and a bar body 30 to which the semiconductor laser 40 and the lens barrel 20 are fixed. The semiconductor laser 40 serves as a light emitting device, while the nickel-plated cylindrical lens barrel 20 and the lens 15 fixed inside the lens barrel 20 constitute an optical device. The bar body 30 serves as the fixing member. A multi-channel light source unit is formed by fixing a plurality of bar bodies 30 to the base board 5 (FIG. 5). FIG. 5 shows a condition where only one bar body 30 fixed to the base board 5 is shown; other bar bodies 30 are not shown. Specifically, a two-dimensional array is formed where the bar bodies 30 to which the semiconductor lasers 40 and the lens barrels 20 are respectively fixed in a line in X direction are fixed onto the base board 5 in Y direction so that each line of the semiconductor laser 40 and the lens barrels 20 are arranged with equal spaces therebetween.

An eight-channel light source unit constituted by one bar body 30 may be formed according to a purpose, or a one-channel light source unit may be formed where a pair of the semiconductor laser 40 and the lens barrel 20 in which the lens 15 is fixed is fixed to a bar body having a pair of holes.

The semiconductor laser 40 consists of one semiconductor laser chip which emits one laser beam, and a photodiode (not shown) for monitoring and a metal package.

The bar body 30 is provided with eight lenses 15 (fixed in the lens barrels 20) so as to pair with the eight semiconductor lasers 40, respectively. The lens 15 converts the laser beam emitted from the corresponding semiconductor laser 40 to a parallel beam. With the groove 50 therebetween, in one attachment portion, the eight holes H1 into which the semiconductor lasers 40 are to be inserted are formed in an array form, and in the other attachment portion, the eight holes H2 into which the lens barrels 20 are to be inserted are formed in an array form. The hole H1 and the hole H2 are formed to be opposite to each other so that the optical axes PX1 and AX1 can be adjusted when the semiconductor laser 40 and the lens barrel 20 are inserted thereinto, respectively, as shown in FIG. 3, and are arranged in a form corresponding to a required beam arrangement (in X direction). The holes H1 and H2 are arranged on a same line.

As shown in FIG. 3, the semiconductor laser 40 is fixed by the subsequently-described YAG welding under a condition where the tip thereof is being inserted into the hole H1 from the left side and a part thereof is in contact with the reference surface $S_0$ (FIG. 5). Specifically, the external shape of the semiconductor laser 40 consists of a smaller-diameter portion 40a and a brim-shaped larger-diameter portion 40b, and fixing is performed in a manner described later after the smaller-diameter portion 40a is inserted into the hole and positioning is made with reference to the reference surface $S_0$ by bringing the larger-diameter portion 40b in contact with the surface $S_0$.

The groove 50 is formed in the center of the bar body 30 so that the position adjustment of the lens 15 in Z direction can be made by drawing the lens barrel 20 backward and forward from the groove 50 side or the attachment portion side (the right side of the holes H2) under a condition where the lens barrel 20 is being inserted into the hole H2 from the right side.

The fixing of the lens barrel 20 and the semiconductor laser 40 is performed by YAG laser welding from the outside of the bar body 30 to the border between the bar body 30 and the lens barrel 20 and the border between the bar body 30 and the semiconductor laser 40 from the outside, and by application of an adhesive 70 inside the bar body 30 to the bar body 30 and the lens barrel 20 and by an adhesive 75 applied to cover the laser welding points.

Particularly, regarding the fixing of the lens barrel 20 to the bar body 30, since the lens barrel 20 is longer in the advance direction of the laser beam and rotation decentering thereof readily occurs for this reason, fixing is performed by YAG laser welding to the border between the bar body 30 and an end portion of the lens barrel 20 (in other words, the right-end entrance of the hole H2) and by application of the adhesive 70 into a hole 60 formed to penetrate the bar body 30 from the outside all the way to the periphery of the lens barrel 20 which has been positioned inside the bar body 30.

Regarding the fixing of the semiconductor laser 40, since it is not longer in the irradiation direction of the laser beam and rotation decentering thereof hardly occurs for this reason, the application of the adhesive 75 and YAG laser welding are performed to the same positions. However, if the fixing of the semiconductor laser 40 by the adhesive 75 is performed by forming a hole similar to the hole 60 in the bar body 30 and applying the adhesive 75 into the hole, the adhesive strength will be stabler and higher.

Subsequently, a method of manufacturing the above-described embodiment will be described. The structure of the bar body 30 of this embodiment is the same as the bar body 34 of the conventional light source unit of FIGS. 1 and 2 except that the hole 60 is provided which vertically penetrates the holes H2 where the lens barrels 20 are inserted and positioned.

First, as shown in FIG. 3, the lens barrel 20 in which the lens 15 is fixed is inserted into the hole H2 of the bar body 30 similarly to the prior art of FIGS. 1 and 2. Then, the semiconductor laser 40 is inserted from the left side of the hole H1 into the hole H1 formed to penetrate the bar body 30 in Z direction. Then, with the beam emitting point (located on the optical axis PX1 of the semiconductor laser 40) of the semiconductor laser 40 as a reference, the positioning of the semiconductor laser 40 in X and Y directions (within 1 $\mu$m in X and Y directions) and the positioning of the lens barrel 20 in Z direction (within 10 $\mu$m in Z direction) are performed. The position of the semiconductor laser 40 relative to the position of the lens barrel 20 is adjusted so that the laser beam exiting from the lens barrel 20 advances vertically to the reference surface $S_0$ (see FIG. 5) of the bar body 30.

Then, the fixing of the lens barrel 20 and the semiconductor laser 40 to the bar body 30 by YAG laser welding is performed. This fixing is performed by performing YAG laser welding to the border between the bar body 30 and the lens barrel 20 and the border between the bar body 30 and the semiconductor laser 40 from the outside of the bar body. As a result of the welding, a part of the bar body melts and hardens to form a fixing means. While either of the lens barrel 20 and the semiconductor 40 may be welded first, in this embodiment, the lens barrel 20 is welded first so that the positioning of the semiconductor laser 40 and the lens barrel 20 can more accurately be performed.

While maintaining the positioned condition of the lens barrel 20, as shown in FIG. 4, YAG laser beams LB of the same intensity are simultaneously irradiated from YAG laser nozzle units 10a and 10b (solid line), respectively, arranged to be opposite to each other with respect to the center (optical axis AX1) of the lens barrel 20. The welding points thereof are a welding point $P_1$ by the YAG laser beam from the YAG laser nozzle unit 10a and a welding point $P_2$ by the YAG laser beam LB from the YAG laser nozzle unit 10b.

After the welding to the welding points $P_1$ and $P_2$ are completed, the YAG laser nozzle units 10a and 10b are simultaneously rotated by a predetermined angle (in the directions of arrows $R_a$ and $R_b$) about the center (optical axis AX1) of the lens barrel 20. At this time, the YAG laser nozzle units 10a and 10b may be separately rotated, or an apparatus where the YAG laser nozzle units 10a and 10b are integrally formed may be used. After the rotation, YAG laser welding is performed to welding points $P_3$ and $P_4$ by the YAG laser beams LB irradiated from the YAG laser nozzle units 10a and 10b (the rotated YAG laser nozzle units are represented by chain double-dashed lines).

Although a strength (5 kg or more in a direction of optical axis AX) sufficient for practical use is obtained by two-point welding (to welding points of 0.2 to 0.3 mm), the strength (particularly tilt strength) can be largely increased by performing four-point welding like in this embodiment. This is because welding points spread not in a line form but in a plane form. In performing four or more-point welding, while the welding may be performed by repeating the two-point welding like in this embodiment, welding may be simultaneously performed to four or more points.

Then, similarly to the YAG laser welding of the lens barrel 20, the semiconductor laser 40 is YAG laser-welded to the bar body 30. The welding points $Q_1$ to $Q_2$ of the semiconductor laser 40 are arranged to correspond to the welding points $P_1$ to $P_4$ of the lens barrel 20 (the welding points $Q_1$ and $Q_4$ are not shown in the figure).

Then, the fixing of the lens barrel 20 to the bar body 30 is performed by filling the adhesive 70 into the hole 60. Likewise, the fixing of the semiconductor laser 40 is performed by applying the adhesive 75 to the welding points $Q_1$ to $Q_4$. Since the fixing of the lens barrel 20 and the semiconductor laser 40 by YAG laser welding has already been performed, either of the filling of the adhesive 70 and the application of the adhesive 75 may be performed first. In this embodiment, a two-component thermosetting adhesive made of epoxy resin is applied as the adhesive 70 into the hole 60 from a non-illustrated tank by a dispenser. Since YAG laser welding has already been performed, the fixing work requires only a short period of time, and position shift hardly occurs in the subsequently-described heat treatment.

As for the adhesives 70 and 75, it is preferable to use two-component room temperature setting adhesive or a thermosetting adhesive. In the case where the thermosetting adhesive is used, since it hardly sets at room temperature, it is necessary to set it by a heat treatment for from several minutes to several hours. In the case where the two-component room temperature setting adhesive is used, since it sets at room temperature, no heat treatment is necessary. However, since the viscosity thereof gradually increases after the two components are mixed, the application must be done as soon as they are mixed. In the case where the thermosetting adhesive is used, since the viscosities of the adhesives 70 and 75 hardly change at room temperature, the bar body 30 or the light source unit 1 in which the adhesive is applied into the hole 60 from a tank by a dispenser is put in a heating oven, where the treatment of a large number of bar bodies 30 or light source units 1 can be performed at a time by putting a large number of bar bodies 30 or light source units 1 in the oven. In the case where the instantaneous adhesive is used, although the fixing is completed in an extremely short period of time, the adhesive strength is low and the life is short. In the case where the ultraviolet setting adhesive is used, although a large number of bar bodies or light source units can be treated at a time like in the case where the thermosetting adhesive is used, it is possible to set only a surface portion of the adhesive filled in the hole. From the above, it is understood that the thermosetting adhesive is industrially preferable when the light source unit is made of heat resistant materials.

It has been technically difficult to stably fix a long optical system such as the lens barrel 20 with a high strength. According to the structure of this embodiment, however, since a surface along the length is fixed, the decentering of the lens barrel 20 and the lens 15 hardly occur when a shock is given. That is, in the prior art where only one end portion of the lens barrel 20 is YAG laser-welded, since the rotation decentering more readily occurs because of the clearance (10 to 20 μm), it is difficult to obtain an accuracy of ±0.2 milliradians; however, when the adhesive 70 is applied into the hole 60 and the welding points by YAG laser welding and the fixing point by the application of the adhesive 70 are lined along the length of the lens barrel 20 like in this embodiment, such rotation decentering hardly occurs.

Similarly, the rotation decentering hardly occurs when the adhesive 70 is applied to the left side end portion of the lens barrel 20. However, this is disadvantageous in that since the adhesive must be applied from the groove 50 side, the application of the adhesive is difficult and the adhesive is readily dripped into the lens barrel 20.

When only the fixing by the adhesive 70 is performed, it is necessary to do something to maintain a condition where the lens barrel 20 has been positioned until the adhesive 70 sets (for approximately 5 to 10 minutes) while preventing the laser beam emitted by the semiconductor laser 40 from inclining by approximately 0.01° or more. This is because the positioning of the lens barrel 20 and the semiconductor laser 40 requires not a mechanical positioning accuracy (±50 μm order) but an optical positioning accuracy (±5 μm order). When only the adhesive 70 is used, the lens barrel 20 inclines due to the shrinkage force generated when the adhesive 70 sets. In this embodiment, however, since YAG laser welding has already been performed, the decentering of the laser beam hardly occurs.

In an eight-channel parallel beam array constructed using this embodiment, inclination angles $\theta_x$ and $\theta_y$ to Z axis (axis vertical to the reference surface $S_0$ of the laser beam) and the difference between the angles $\theta_x$ and $\theta_y$ were measured immediately after YAG welding and after setting of the adhesive 70. The results are shown in Table 1. A detector was arranged at a position $z_0$ (FIG. 5) which is one meter away from the semiconductor laser 40. The distance from the center of a beam spot formed by a laser beam (optical axis AX1) irradiated vertically to the fixed reference surface $S_0$ to the center of a beam spot formed by a laser beam (optical axis AX2) measured at the X-Y surface at the position $z_0$ was measured. From the result, the inclination angles $\theta_x$ and $\theta_y$ were obtained. As is apparent from the results shown in Table 1, the inclination angles $\theta_x$ and $\theta_y$ are extremely small, specifically, within ±0.2 milliradians (=±0.01°).

TABLE 1

| | Inclination Angle (milliradian) | | | | | |
| --- | --- | --- | --- | --- | --- | --- |
| | After YAG laser welding | | After setting of applied adhesive | | Difference | |
| | $\theta_x$ | $\theta_y$ | $\theta_x$ | $\theta_y$ | $\theta_x$ | $\theta_y$ |
| 1 | 0.2 | −0.2 | 0.3 | −0.3 | +0.1 | −0.1 |
| 2 | −0.2 | 0.2 | −0.2 | 0.1 | 0 | −0.1 |
| 3 | −0.1 | 0 | −0.2 | 0.2 | −0.1 | +0.2 |
| 4 | −0.1 | 0.1 | 0 | 0 | +0.1 | −0.1 |
| 5 | −0.2 | 0.2 | −0.2 | 0 | 0 | −0.2 |
| 6 | −0.5 | −0.5 | −0.4 | −0.7 | +0.1 | −0.2 |
| 7 | −0.6 | 0 | −0.5 | 0 | +0.1 | 0 |
| 8 | −0.5 | 0 | −0.6 | −0.1 | −0.1 | −0.1 |

Figure 6:
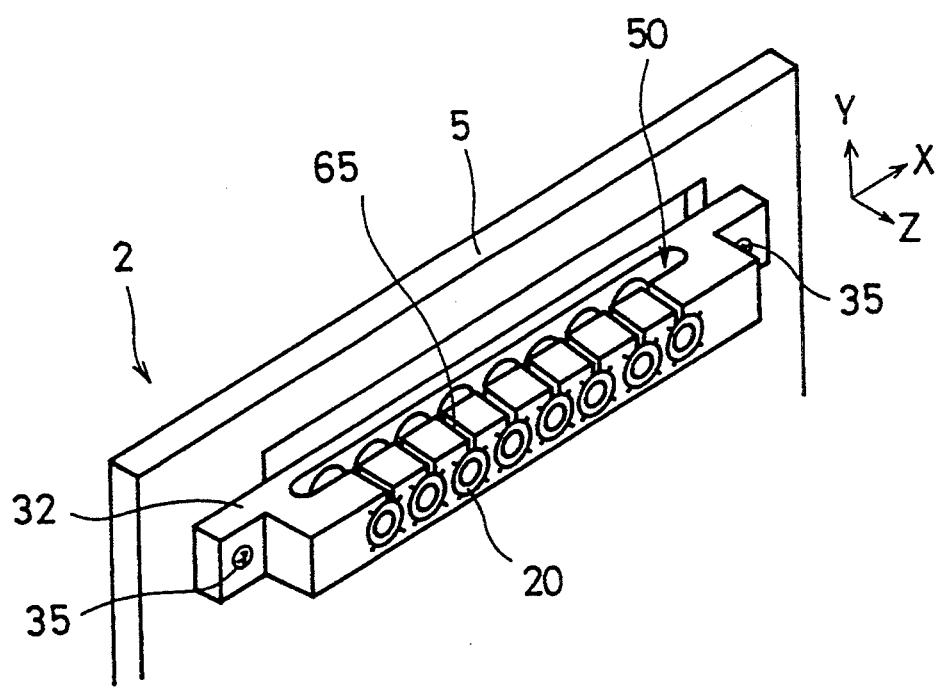
FIG. 6 is a perspective view showing the exterior of a principal portion of a light source unit which is another embodiment of the present invention.

FIG. 6 is a perspective view showing the exterior of a principal portion of another embodiment of the present invention. The light source unit 2 of this embodiment is the same as that of the embodiment of FIGS. 3 to 5 except that a groove 65 is provided to the bar body 32 along the length of the lens barrel 20 instead of providing the hole 60 to the bar body 30. By applying the adhesive 70 in the groove 65, the fixing can be made with a higher strength than the case where the hole 60 is provided. As described above, the groove 65 or a space having another configuration such as a long hole may be formed in the bar body instead of the hole 60 according to the purpose or working capability.

As described above, according to the present invention, since the fixing of the light emitting device or the optical system to the fixing member is performed by performing laser welding from the outside of the fixing member to the border between the fixing member and the light emitting device or the border between the fixing member and the optical system and by applying an adhesive inside the fixing member to the fixing member and the light emitting device or the optical system, the light emitting device such as the semiconductor laser and the optical system constituted by the lens barrel having a lens are fixed to the fixing member with a high strength, and accordingly, a light source unit having a high tolerance for a shock is realized.

Obviously, many modifications and variations of the present invention are possible in light of the above teachings. It is therefore to be understood that within the scope of the appended claims, the invention may be practiced other than as specifically described.

What is claimed is:

1. A light source unit comprising:
   light emitting means;
   an optical system for directing light, emitted from the light emitting means, to a predetermined position;
   a fixing member having first holes for holding the light emitting means and the optical system;
   fixing means formed by laser welding at an entrance of each of the first holes in order to fix, to the fixing member, the light emitting means and the optical system inserted into the first holes, respectively, so as to be partly exposed; and
   an adhesive applied in order to fix at least one of the light emitting means and the optical system inside the first holes.

2. A light source unit according to claim 1, wherein said fixing member has a second hole vertically penetrating said first hole and wherein the adhesive is applied through the second hole.

3. A light source unit according to claim 2, wherein said adhesive is used for fixing the optical system.

4. A light source unit according to claim 3, wherein said optical system is constituted by a lens barrel inside which a lens is provided and wherein the fixing of the optical system to the fixing member is applied to the lens barrel.

5. A light source unit comprising:
   light emitting means;
   an optical system for directing light emitted from the light emitting means to a predetermined position;
   a fixing member having a groove for holding the optical system;
   fixing means formed by laser welding at an end portion of the groove in order to fix to the fixing member the optical system inserted into the groove so as to be partly exposed; and
   an adhesive applied to the groove in order to fix the optical system at a portion other than the end portion of the groove.

6. A light source unit according to claim 5, wherein said optical system is constituted by a lens barrel inside which a lens is provided and wherein the fixing of the optical system to the fixing member is applied to the lens barrel.

7. A light source unit comprising:
a semiconductor laser for emitting a laser beam;
an optical system for directing the laser beam emitted from the semiconductor laser to a predetermined position, said optical system including a cylindrical lens barrel and a lens attached inside the lens barrel;
a fixing member having a first hole for holding the semiconductor laser and a second hole for holding the optical system, said second hole being formed so as to be opposite to the first hole;
fixing means formed by laser welding at an entrance of the first hole and an entrance of the second hole, for fixing to the fixing member the semiconductor laser and the optical system inserted into the first and second holes, respectively, so as to be partly exposed;
a third hole formed to vertically penetrate the second hole; and
an adhesive filled into the third hole in order to fix the optical system.

8. A light source unit according to claim 7, further comprising an adhesive cured onto the fixing means formed by laser welding at the entrance of the first hole.

* * * * *